UNITED STATES PATENT OFFICE 1,972,764

PROCESS FOR THE PRODUCTION OF STABLE WATER-CONTAINING EMULSIONS OF VEGETABLE LECITHIN

Friedrich Wilhelm Engelmann, Hamburg, Germany, assignor to Harburger Oelwerke Brinckman und Mergell, Harburg-Wilhelmsburg, Germany, a German firm No Drawing. Application August 7, 1933, Serial No. 684,113. In Germany March 27, 1931

9 Claims. (Cl. 252—6)

This invention relates to a process for the production of stable and non-fermenting water-containing emulsions of vegetable lecithin. In a water-free condition, vegetable lecithin extracted from soya beans is indefinitely stable and storable. In the presence of water, however, it quickly sets up fermentation and decomposes, its solubility and other properties being thereby very detrimentally affected. For this reason, complicated and expensive purification processes are necessary, in order to obtain a substance which will serve various useful purposes.

In order to avoid these undesirable operations, it has, heretofore, been proposed to dry the vegetable lecithin, immediately after its separation from the oil, by distilling off the water under reduced air pressure, as, for many technical purposes, such further purification of the vegetable lecithin is unnecessary. This method of attaining stability, however, not only involves substantial labour and expense, but has the further disadvantage that the viscous wax-like vegetable lecithin, in spite of the oil content present, can only be re-dissolved and uniformly dispersed in other substances with difficulty.

Also, it has, heretofore, been attempted to prevent fermentation of the emulsion of lecithin, oil and water by the addition of suitable germicidal agents. For instance, benzoic acid, boric acid, hydrogen peroxide, and the like have been added, and fermentation can actually be restrained by these additions. They have the disadvantage, however, of destroying the emulsion, for the lecithin separates from a part of the liquid constituents consisting of oil and water and settles at the bottom in the form of lumps. In this form, it is difficult to remove from the vessels and has little suitability for further working up. It is apparent than an aqueous emulsion, not too thick, and of a uniform character, can be worked up or dispersed in pulverulent, liquid, or fat-like substances, with much greater ease.

It is the object of the present invention to stabilize the aqueous emulsions of lecithin obtained immediately by the preparation thereof from vegetable materials, such as soya beans, which emulsions, as stated before, have a pronounced tendency to fermentation and to decomposition. It is a further object of the invention to improve not only the stability, but also the appearance and the quality of lecithin emulsions. Consequently, it is not within the contemplation of the present invention to produce a lecithin in any materially water-free or dried form, either crude or bleached.

According to this invention, the difficulties hitherto experienced are overcome and a stable emulsion is obtained which does not go into fermentation. This is achieved by adding to the fresh aqueous lecithin emulsion, for instance the emulsion obtained from the soya beans a small quantity of an alkaline reacting substance such as caustic alkali or alkali carbonates, alkaline earth hydrates, or alkaline or alkaline earth peroxides. An addition of the latter is very advantageous, as the oxygen liberated in the reaction renders the fermentative agents ineffective, while the alkaline or alkaline earth hydrate combines with the free acids and assists in the maintenance of the emulsion.

The content of free acids in the freshly recovered lecithin emulsion is considerably larger than that in the soya bean oil recovered at the same time. It amounts to 5% or more, calculated upon fatty acid. The soap formed by the alkali treatment is intimately mixed with the phosphatides and assists in maintaining the emulsion which preferably has a weakly alkaline reaction.

It has already been proposed to allow hydrogen peroxide to act upon an aqueous lecithin emulsion and then to remove the water by distillation under reduced air pressure in order to clarify the lecithin without impairing the flavour. As already mentioned above, hydrogen peroxide is not suitable for the present purpose because no stable aqueous emulsion can be achieved with it.

For carrying the process into effect, by way of example, a concentrated aqueous solution of ½ to 1 kg. of caustic soda is added to 100 kgs. of freshly obtained soya, paste or slime containing water, with contents of 40% lecithin, 30% soya oil and 30% water. It is well stirred throughout until a uniform dispersion is attained. At this stage slight warming may be effected.

Instead of caustic soda, use may be made under otherwise similar test conditions of ½ to 1 kg. of sodium peroxide dissolved, for instance, in ten times the quantity of water. The excess water-content of the emulsion is removed, preferably by distillation under vacuum, so that the emulsion still contains only about 30% of water.

On account of the difficulty of definitely ascertaining or describing the final reaction product obtained by the process claimed, the composition of matter which forms one feature of the present invention is claimed as such reaction product of the vegetable slime and the designated alkali.

I claim:—

1. The process of preparing a stable, non-fermenting, water-containing emulsion of vegetable lecithin which includes, in combination, the steps of adding a small quantity of alkali peroxide to freshly extracted, undried vegetable slime, consisting substantially entirely of lecithin, oil (from the vegetable source from which the slime is extracted only), and water.

2. The process of preparing a stable, non-fermenting, water-containing emulsion of vegetable lecithin which includes, in combination, the steps of adding to freshly extracted, undried vegetable slime, consisting substantially entirely of lecithin, oil (from the vegetable source from which the slime is extracted only), and water, a quantity of an alkali peroxide in the amount of 0.5% to 1.5% based on the quantity of slime treated.

3. The process of preparing a stable, non-fermenting, water-containing emulsion of vegetable lecithin which includes, in combination, the steps of adding to freshly extracted, undried vegetable slime, consisting substantially entirely of lecithin, oil (from the vegetable source from which the slime is extracted only), and water, a quantity of an alkali metal peroxide in the amount of 0.5% to 1.5% based on the quantity of slime treated.

4. The process of preparing a stable, non-fermenting, water-containing emulsion of vegetable lecithin which includes, in combination, the steps of adding to freshly extracted, undried vegetable slime, consisting substantially entirely of lecithin, oil, and water, a dilute solution of an alkali metal peroxide in water, the amount of such peroxide being 0.5% to 1.5% of the quantity of slime treated.

5. A stable, non-fermenting, water-containing vegetable lecithin emulsion, free from oils other than those normally contained in and associated with the vegetable lecithin as extracted from the plant, said emulsion being the reaction product of lecithin, said oil, water, and an alkali peroxide, the quantity of the lecithin being greater than that of the oil, and the quantity of the alkali peroxide being from 0.5% to 1.5% of the total amount of the other constituents.

6. A stable, non-fermenting, water containing vegetable lecithin emulsion, free from oils other than those normally contained in and associated with the vegetable lecithin as extracted from the plant, said emulsion being the reaction product of lecithin, oil, and water, and an inorganic alkali peroxide in approximately the following percentages: lecithin—40%, oil—30%, water—30%, and 0.5% to 1.5% of the alkali peroxide calculated on the basis of the amount of the other constituents.

7. The process of preparing a stable, non-fermenting, water-containing emulsion of vegetable lecithin which includes, in combination, the steps of adding a small quantity of an alkaline reacting substance, selected from the group consisting of caustic alkali, alkali carbonates, alkaline earth hydrates, alkali peroxides, and alkaline earth peroxides, to freshly extracted, undried vegetable slime, consisting substantially entirely of lecithin, oil (from the vegetable source from which the slime is extracted only), and water.

8. The process of preparing a stable, non-fermenting, water-containing emulsion of vegetable lecithin which includes, in combination, the steps of mixing therewith while warming slightly a small quantity of an alkaline reacting substance, selected from the group consisting of caustic alkali, alkali carbonates, alkaline earth hydrates, alkali peroxides, and alkaline earth peroxides, to freshly extracted, undried vegetable slime, consisting substantially entirely of lecithin, oil (from the vegetable source from which the slime is extracted only), and water.

9. A stable, non-fermenting, water containing vegetable lecithin emulsion, free from oils other than those normally contained in and associated with the vegetable lecithin as extracted from the plant, said emulsion being the reaction product of lecithin, oil, and water, and an alkaline reacting substance, selected from the group consisting of caustic alkali, alkali carbonates, alkaline earth hydrates, alkali peroxides, and alkaline earth peroxides, in approximately the following percentages: lecithin—40%, oil—30%, water—30%, and 0.5% to 1.5% of said alkali reacting substance calculated on the basis of the amount of the other constituents.

FRIEDRICH WILHELM ENGELMANN.